(12) United States Patent
Petrick

(10) Patent No.: US 8,103,888 B2
(45) Date of Patent: Jan. 24, 2012

(54) METHOD AND APPARATUS FOR POWER SAVINGS IN A MULTI-THREADED PROCESSOR USING A SYMBOL GATED WITH A CLOCK SIGNAL

(75) Inventor: Bruce Petrick, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 488 days.

(21) Appl. No.: 12/324,182

(22) Filed: Nov. 26, 2008

(65) Prior Publication Data

US 2010/0131784 A1    May 27, 2010

(51) Int. Cl.
    *G06F 1/32*    (2006.01)
(52) U.S. Cl. ........................ 713/320; 713/322
(58) Field of Classification Search ........... 713/300–340
    See application file for complete search history.

(56) References Cited

U.S. PATENT DOCUMENTS

| | | | | |
|---|---|---|---|---|
| 6,223,208 | B1 * | 4/2001 | Kiefer et al. | 718/108 |
| 7,093,147 | B2 * | 8/2006 | Farkas et al. | 713/320 |
| 7,185,214 | B2 * | 2/2007 | Espinoza-Ibarra et al. | 713/320 |
| 7,484,111 | B2 * | 1/2009 | Fung | 713/320 |
| 7,523,330 | B2 * | 4/2009 | Golla et al. | 713/322 |
| 2004/0030944 | A1 * | 2/2004 | Barr et al. | 713/400 |
| 2006/0026447 | A1 * | 2/2006 | Naveh et al. | 713/322 |
| 2007/0016815 | A1 * | 1/2007 | Cooper et al. | 713/322 |
| 2007/0043964 | A1 * | 2/2007 | Lim et al. | 713/322 |
| 2008/0189569 | A1 * | 8/2008 | Chu | 713/600 |
| 2008/0307244 | A1 * | 12/2008 | Bertelsen et al. | 713/323 |
| 2009/0222654 | A1 * | 9/2009 | Hum et al. | 713/100 |

* cited by examiner

*Primary Examiner* — Raymond Phan
(74) *Attorney, Agent, or Firm* — Polsinelli Shughart, PC

(57) ABSTRACT

Methods and apparatuses are presented that allow power savings on a processor executing a plurality of threads on a plurality of cores. The method may include providing a first timing signal to a processor, determining the power requirements of the processor, loading a symbol into a shift register, where the symbol may be associated with the power requirements of the processor, providing a second timing signal to the processor, where the second timing signal may include a gated representation of the first timing signal and the symbol.

Figure 1:
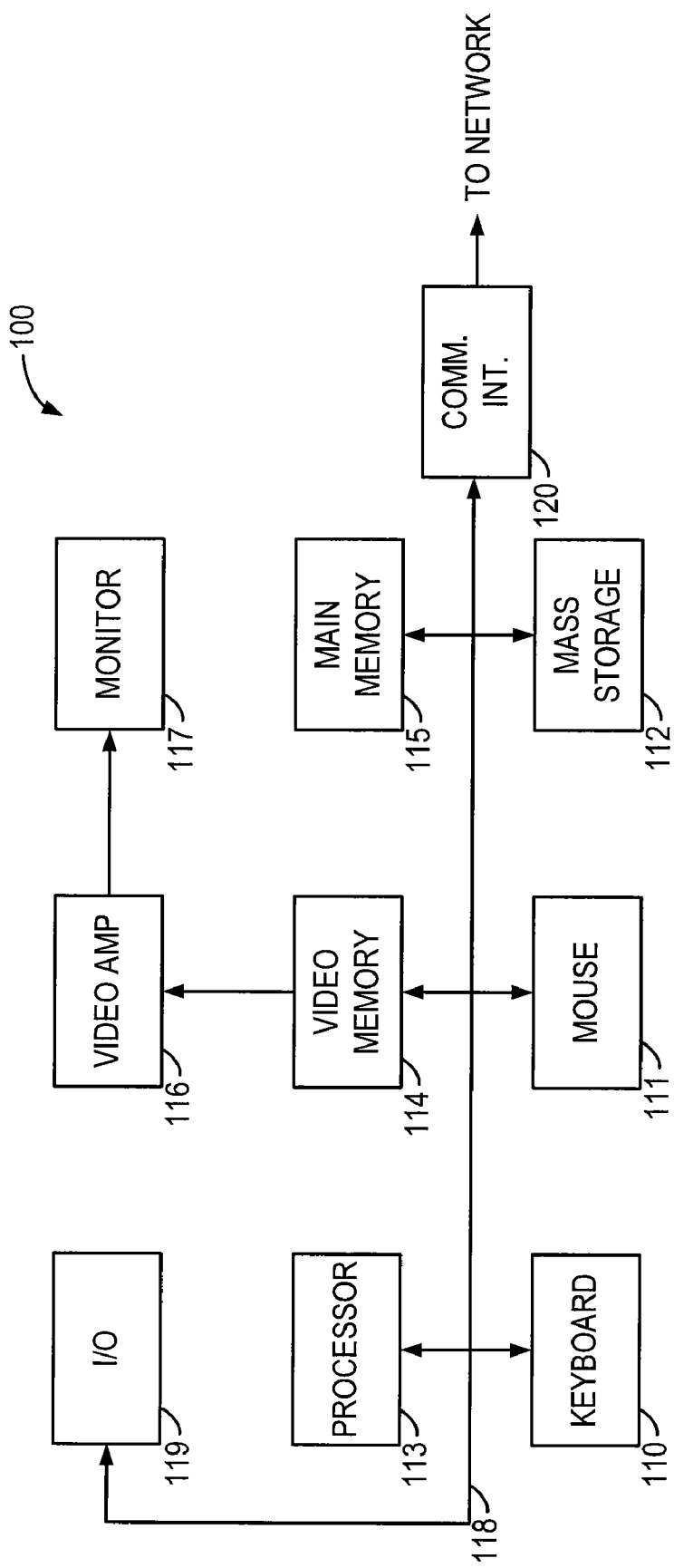

20 Claims, 5 Drawing Sheets

METHOD AND APPARATUS FOR POWER SAVINGS IN A MULTI-THREADED PROCESSOR USING A SYMBOL GATED WITH A CLOCK SIGNAL

BACKGROUND OF THE INVENTION

1. Technical Field

The present invention relates generally to power management of electronic devices, and more particularly to providing power savings for multi-threaded processors.

2. Background

Electronic devices are ubiquitous in society and can be found in everything from wristwatches to computers. The complexity and sophistication of these electronic devices usually increases with each generation. For example, newer microprocessors often have higher operating frequencies than previous generations of microprocessors. As a result of the increased operating frequencies, newer generations of microprocessors may consume more power than previous generations of microprocessors.

In addition to the increased operating frequency potentially causing increased power consumption, this increased operating frequency also may cause a growing disparity between the speed that a computer's microprocessor operates at versus the computer's memory access speed. Because of this disparity, computers with high speed microprocessors may spend a large amount of time waiting for memory references to complete instead of performing computational operations. Some microprocessors may attempt to execute multiple threads of program code concurrently to offset this downtime. Notwithstanding the increase in throughput of the program code that comes with multi-threading, there still remains a need for providing methods and apparatuses that conserve power in multi-threaded processors.

SUMMARY

Methods and apparatuses are presented that allow power savings on a processor executing a plurality of threads on a plurality of cores. The method may include providing a first timing signal to a processor, determining the power requirements of the processor, loading a symbol into a shift register, where the symbol may be associated with the power requirements of the processor, providing a second timing signal to the processor, where the second timing signal may include a gated representation of the first timing signal and the symbol.

Other embodiments may include a multi-threaded processor, the multithreaded processor including a plurality of cores, where each core within the plurality may include one or more header circuits, a clock control unit (CCU) coupled to the one or more header circuits, where the CCU may provide a first timing signal and a symbol to the one or more header circuits, where the symbol may be associated with the power requirements of the processor, and where each of the one or more header circuits may provide a second timing signal to the plurality of cores, where the second timing signal may include a gated representation of the first timing signal and the symbol.

Still other embodiments may include a computer system that may include an input unit, a processor coupled to the input unit, the processor may include a plurality of cores, where each core within the plurality may include one or more header circuits, a clock control unit (CCU) coupled to the one or more header circuits, where the CCU may provide a first timing signal and a symbol to the one or more header circuits, where the symbol may be associated with the power requirements of the processor, and where each of the one or more header circuits may provide a second timing signal to the plurality of cores, where the second timing signal includes a gated representation of the first timing signal and the symbol.

BRIEF DESCRIPTION

Figure 2:
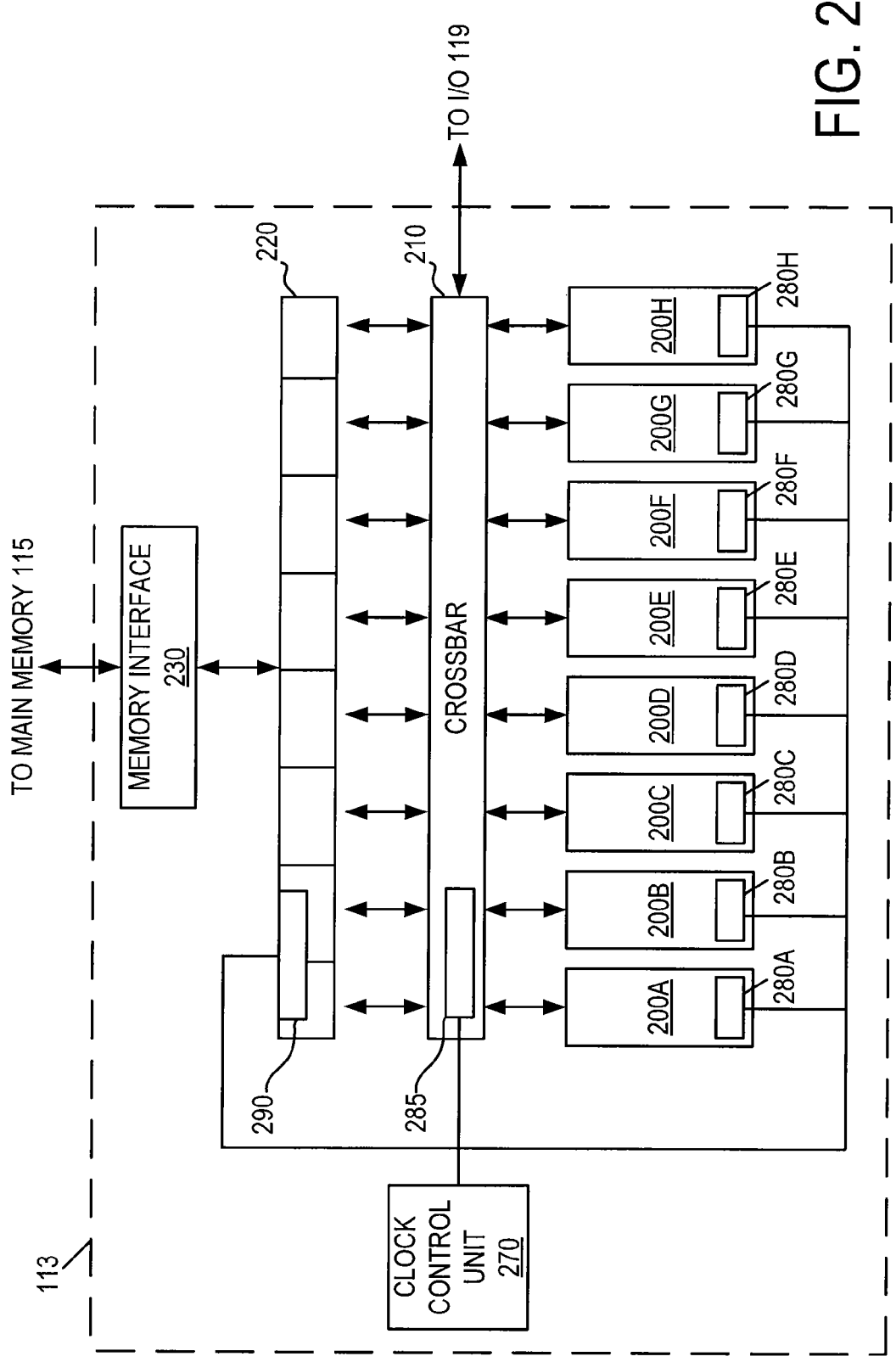
Figure 3A:
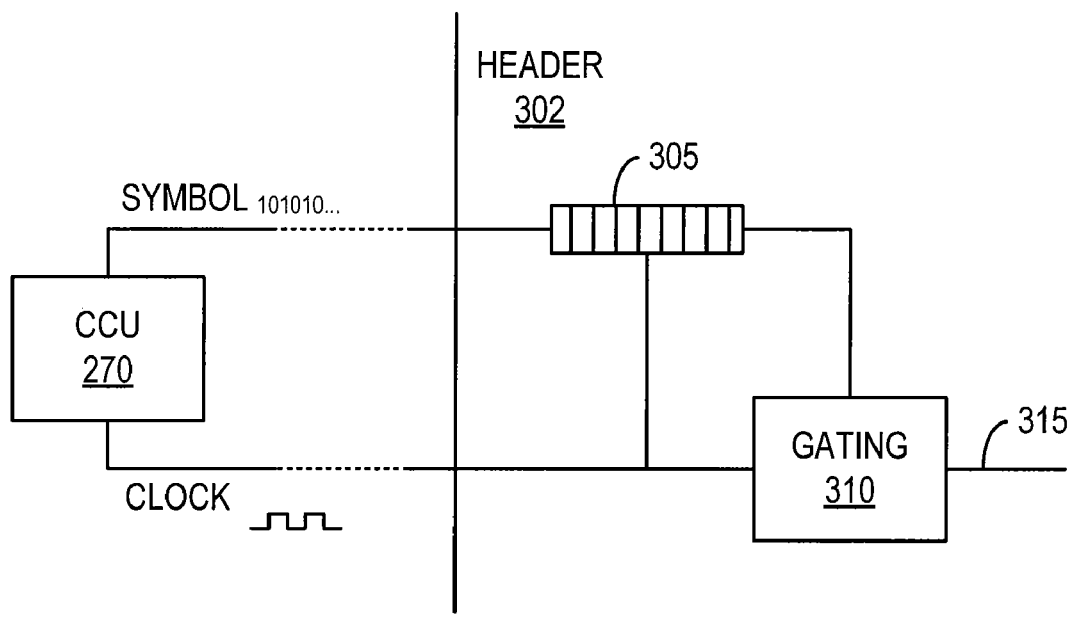
Figure 3B:
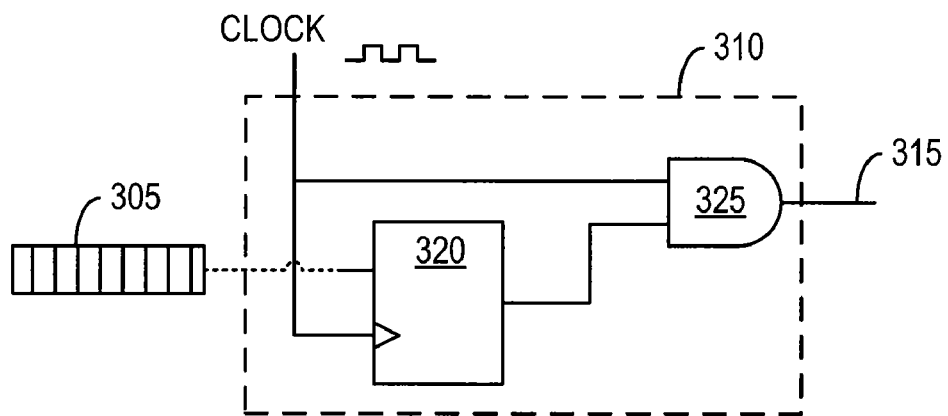
Figure 4:
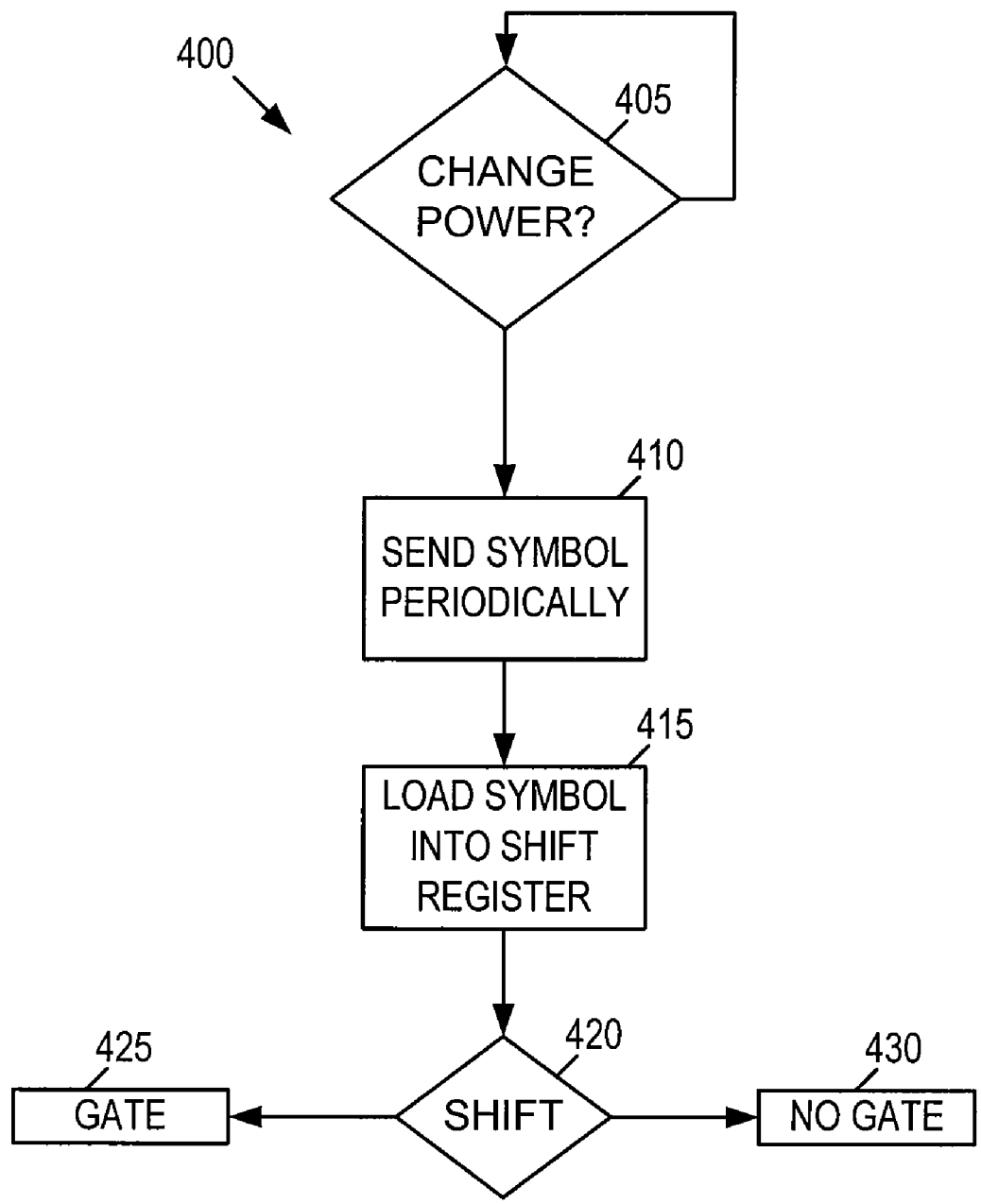
Figure 5:
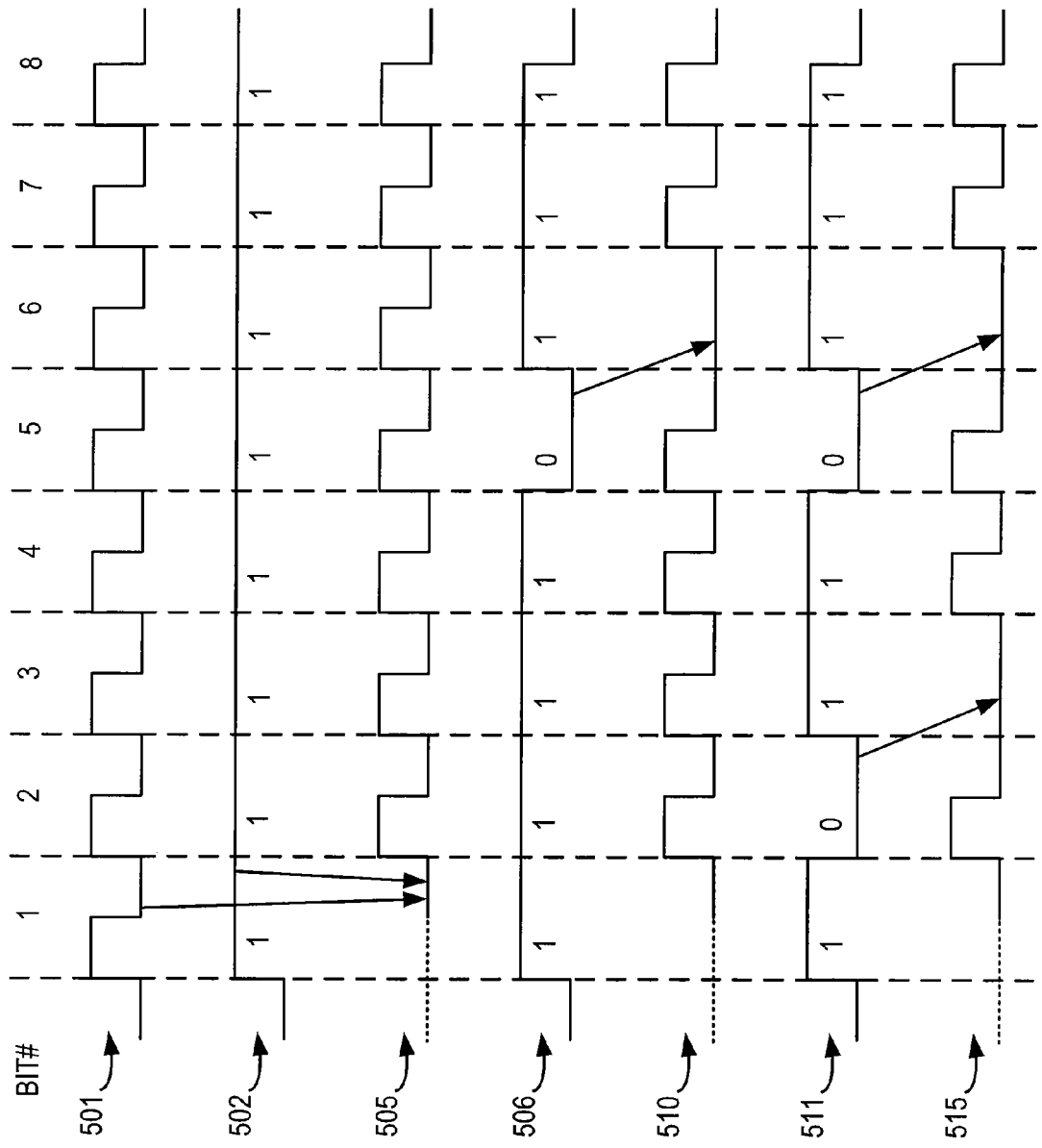

FIG. 1 illustrates an exemplary computer system.
FIG. 2 illustrates an exemplary processor.
FIG. 3A illustrates an exemplary header circuit.
FIG. 3B illustrates an exemplary gating circuit.
FIG. 4 illustrates an exemplary power savings method.
FIG. 5 illustrates an exemplary timing diagram.
The use of the same reference numerals in different drawings indicates similar or identical items.

DETAILED DESCRIPTION OF THE INVENTION

In some embodiments, methods and apparatuses may be provided that allow a multi-threaded processor to conserve the overall amount of power it consumes during periods of low processor activity.

FIG. 1 illustrates a computer system 100 capable of implementing power savings for its processor. In some embodiments, the computer system 100 may be an implementation of enterprise level computers, such as one or more blade-type servers within an enterprise. In other embodiments, the computer system 100 may be a personal computer and/or a handheld electronic device. A keyboard 110 and mouse 111 may be coupled to the computer system 100 via a system bus 118. The keyboard 110 and the mouse 111, in one example, may introduce user input to the computer system 100 and communicate that user input to a processor 113. Other suitable input devices may be used in addition to, or in place of, the mouse 111 and the keyboard 110. An input/output unit 119 (I/O) coupled to system bus 118 represents such I/O elements as a printer, audio/video (A/V) I/O, etc.

Computer 100 also may include a video memory 114, a main memory 115 and a mass storage 112, all coupled to the system bus 118 along with the keyboard 110, the mouse 111 and the processor 113. The mass storage 112 may include both fixed and removable media, such as magnetic, optical or magnetic optical storage systems and any other available mass storage technology. The bus 118 may contain, for example, address lines for addressing the video memory 114 or the main memory 115. In some embodiments, the main memory 115 is a fully buffered dual inline memory module (FB-DIMM) that communicates serially with other system components.

The system bus 118 also may include a data bus for transferring data between and among the components, such as the processor 113, the main memory 115, the video memory 114 and the mass storage 112. The video memory 114 may be a dual-ported video random access memory. One port of the video memory 114, in one example, is coupled to a video amplifier 116, which is used to drive a monitor 117. The monitor 117 may be any type of monitor suitable for displaying graphic images, such as a cathode ray tube monitor (CRT), flat panel, or liquid crystal display (LCD) monitor or any other suitable data presentation device.

In some embodiments, the processor 113 is a SPARC® microprocessor from Sun Microsystems, Inc, although any other suitable microprocessor or microcomputer may be utilized. The processor 113 and its power savings mechanisms are described in more detail below with regard to FIG. 2-5.

The computer system 100 also may include a communication interface 120 coupled to the bus 118. The communication interface 120 provides a two-way data communication coupling via a network link. For example, the communication interface 120 may be a local area network (LAN) card, or a cable modem, and/or wireless interface. In any such implementation, the communication interface 120 sends and receives electrical, electromagnetic or optical signals which carry digital data streams representing various types of information.

Code received by the computer system 100 may be executed by the processor 113 as it is received, and/or stored in the mass storage 112, or other non-volatile storage for later execution. In this manner, the computer system 100 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

FIG. 2 illustrates an exemplary implementation of the processor 113 that may be capable of implementing one or more low power modes. As shown, the processor 113 may include a plurality of processor cores 200A-H. Each of the cores 200A-H may couple to an L2 cache 220 via a crossbar 210. The L2 cache 220 may couple to one or more memory interface(s) 230, which, in turn, may couple to one or more banks of main memory 115 (not specifically shown in FIG. 2). Additionally, the crossbar 210 may couple the cores 200A-H to the I/O unit 119 (shown in FIG. 1). In some embodiments, the processor 113 may be implemented on a single integrated circuit. Furthermore, in some embodiments, the crossbar 210 and the L2 cache 220 may be omitted, such as may be the case with a single multi-threaded processor.

The cores 200A-H may be configured to execute instructions and to process data according to a particular instruction set architecture (ISA). In one embodiment, the cores 200A-H may be configured to implement the SPARC® V9 ISA, although in other embodiments it is contemplated that any desired ISA may be employed, such as x86, PowerPC® and/or MIPS®, to name but a few. As shown in FIG. 2, each of the cores 200A-H may be configured to operate independently of the others, such that all the cores 200A-H may execute code in parallel. Additionally, in some embodiments each of the cores 200A-H may be configured to execute multiple threads concurrently, where a given thread may include a set of instructions that may execute independent of instructions from another thread. For example, an individual software process executing on the computer system 100, such as an application, may consist of one or more threads that may be scheduled for execution by an operating system. In some implementations, each of the cores 200A-H may be configured to concurrently execute instructions from eight threads, for a total of 64 threads concurrently executing across the processor 113.

In some embodiments, such as where the processor 113 is implemented on a single integrated circuit, certain portions of the cores 200A-H may be shared among the threads to preserve space. For example, each core 200A-H may share an L1 cache, the floating point pipeline, and/or the memory pipeline (not specifically shown in FIG. 2). Because certain portions of each core 200A-H may be shared amongst all the threads being executed on the core 200A-H, each core 200A-H may switch between the different threads on a cycle-by-cycle basis. That is, if there is a thread that encounters a latency event, such as a cache miss, then that thread may be marked unavailable for a predetermined period of time while other threads execute. Also, as a result of sharing resources within a core 200A-H, the threads may issue a predetermined number of instructions for each clock cycle of the processor (the clock cycles of the processor 113 are discussed in more detail below). For example, in some embodiments, each core 200A-H may have four threads per core, where a single thread can issue an instruction on each cycle of the processor 113. In this manner, instructions from threads may be issued in a round-robin fashion and subsequently executed. The cores 200A-H are capable of executing multiple threads concurrently and may be referred to as a "multithreaded" (MT) cores.

The crossbar 210 may be configured to manage data flow between the cores 200A-H and the shared L2 cache 220. In some embodiments, the crossbar 210 may include logic (such as multiplexers or a switch fabric, for example) that may allow any core 200A-H to access any bank of L2 cache 220, and that conversely may allow data to be returned from any L2 bank to any core 200A-H. The crossbar 210 may be configured to concurrently process data requests from the cores 200A-H to the L2 cache 220 as well as data responses from the L2 cache 220 to the cores 200A-H. In some embodiments, the crossbar 210 may include logic to queue data requests and/or responses, such that requests and responses may not block other activity while waiting for service. Additionally, the crossbar 210 may be configured to arbitrate conflicts that may occur when multiple cores 200A-H attempt to access a single bank of the L2 cache 220 or vice versa.

The L2 cache 220 may be configured to cache instructions and/or data for use by the cores 200A-H. As shown in FIG. 2, the L2 cache 220 may be organized into multiple separately addressable banks that may each be independently accessed, such that in the absence of conflicts, each bank may concurrently return data to the core 200A-H requesting the data. In some embodiments, each individual bank may be implemented using set-associative or direct-mapped techniques. For example, in one embodiment, the L2 cache 220 may be a 6 megabyte (MB) cache, where each bank is 24-way set associative with a 64-byte line size, although other cache sizes and geometries are possible and contemplated. The L2 cache 220 may be implemented in some embodiments as a writeback cache in which written (dirty) data may not be written to the main memory 115 until a corresponding cache line is evicted.

In some embodiments, the L2 cache 220 may implement queues for requests arriving from and results to be sent to the crossbar 210. Additionally, in some embodiments, the L2 cache 220 may implement a fill buffer configured to store fill data arriving from the memory interface 230, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). The L2 cache 220 may be implemented as a single-ported cache or a multiported cache (i.e., capable of processing multiple concurrent read and/or write accesses). In either case, the L2 cache 220 may implement arbitration logic to prioritize cache access among various cache read and write requesters.

The memory interface 230 may be configured to manage the transfer of data between L2 cache 220 and the main memory 115, for example in response to L2 fill requests and data evictions. In some embodiments, multiple instances of the memory interface 230 may be implemented, with each instance configured to control a respective bank of the main memory 115.

The timing or clock signals within the processor 113 may be provided with a clock control unit (CCU) 270. As shown in FIG. 2, the CCU 270 may be coupled to the cores 200A-H, the crossbar 210 and the L2 cache 220. Although this disclosure will focus on the CCU's 270 connection to the cores 200A-H, the crossbar 210 and the L2 cache 220, the CCU 270 may couple to other blocks within the processor 113 as shown in FIG. 2.

During operation, the CCU 270 may provide a plurality of timing or clock signals to the various blocks within the processor 113. Although the CCU 270 may be capable of providing multiple clock signals, the CCU 270 may provide a common clock signal to the cores 200A-H, the crossbar 210, and the L2 cache 220 while providing separate non-core clock signals to the other blocks within the CCU 270. For example, the clock signal provided to the cores 200A-H, the crossbar 210, and the L2 cache 220 may be approximately 1.65 GHz while the clock signal provided to the memory interface 230 may be 667 MHz in some embodiments. Providing one or more common signals to blocks such as the cores 200A-H, the crossbar 210, and/or the L2 cache 220 may allow these blocks to coordinate activity while in low power mode. This is described in greater detail below.

The actual clock generation circuitry within the CCU 270 may take a variety of physical forms, including in some embodiments, a crystal based oscillator with relatively low phase noise and/or clock jitter. In other embodiments, the clock generation circuitry within the CCU 270 may be a frequency synthesized signal based on a crystal oscillator signal, such as a phase locked loop (PLL) synthesizer or a delay-locked-loop (DLL) synthesizer. Since the PLL and/or DLL are feedback and control loops that may synthesize a clock signal, there may be a predetermined period of time that elapses before for the PLL and/or DLL "lock" or provide a stable output clock signal to each of the blocks.

Regardless of the physical form of the circuitry that provides the clock signal, the clock signal may couple to one or more header circuits, such as the header circuits 280A-H, 285, and 290 within the cores 200A-H, the crossbar 210, and the L2 cache 220 respectively as shown in FIG. 2. In some embodiments, the header circuits 280A-H, 285, and 290 may be used to gate one or more of the clock signals from the CCU 270 and effectuate an overall reduction in the power consumption of the processor 113 during times of low activity. Furthermore, in some embodiments, the gating of the clock signals may be associated with the number of threads that remain active during the low power state, and thus the overall issue bandwidth of the core 200A-H may be maintained during low power states.

FIG. 3A illustrates a more detailed view of the interface between the CCU 270 and the header circuit 302. Note that the header circuit 302 may represent any one of the header circuits 280A-H, 285, and/or 290. As shown, the header circuit 302 may include a shift register 305 coupled to a gating structure 310. During operation, the CCU 270 may deliver the clock signal to the gating structure 310 and also may deliver a symbol to the shift register 305. The symbol delivered may comprise a plurality of bits that are used by the gating structure 310 to produce a predetermined number and/or pattern on the resulting signal line 315 of pulses for distribution within the blocks (such as the cores 200A-H, the crossbar 210, and the L2 cache 220).

Over time these constituent bits may be shifted out of the shift register 305 where they may be used by the gating structure 310. For example, in some embodiments, the shift register 305 may be coupled to the clock signal and the constituent bits may be shifted out of the shift register 305 with each transition of the clock signal.

As the constituent bits of the clock signal are shifted out of the shift register 305, the gating structure 310 may logically combine the symbol with the clock signal to produce the ultimate timing signal for use within the blocks on the signal line 315. By altering the constituent bits and/or pattern of the symbol, the timing signal provided to the blocks on signal line 315 also may be altered. Since the power consumed by the blocks within the processor 113 (such as the cores 200A-H, the crossbar 210, and the L2 cache 220) is generally a function of the number of clock transitions that occur within a predetermined period of time, the power consumption of the various blocks within the processor 113 may be controlled by altering the symbol provided. Notably, this may occur without adjusting the frequency provided by the PLL or other clock generating circuitry, which may require re-locking the PLL.

In some embodiments, the header circuit 302 in the each of the blocks within the processor 113 (e.g., the header circuits 280A-H, 285, and 290) may receive separate symbols. Thus, in some embodiments, the processor 113 may separately control their power state. For example, the core 200A may receive a different symbol than the core 200B or the gating within the header circuit 280A may be different than the gating within the header circuit 280B. As a result, in some embodiments, the power consumed by each of the cores 200A-H may be adjusted independently.

FIG. 3B illustrates but one exemplary clock gating structure 310 according to some embodiments. Other gating structures also are possible. As shown in FIG. 3B, the shift register 305 may be coupled to a latch 320. The clock signal also may couple to the latch 320 and a logic gate 325. During operation, the latch 320 may be transparent when the clock signal is low and holds the previous input after the clock goes high. Accordingly, the signal on the signal line 315 may be a gated representation of the clock signal.

FIG. 4 illustrates an exemplary method 400 of clock gating that may be implemented by the header circuit 302. In block 405, the computer system 100 (shown in FIG. 1) may determine if a change in the power consumption of one or more of the blocks within the processor 113 is desired. This may be because the computer system 100 is experiencing low activity. For example, the computer system 100 may experience less of a workload during the nighttime than during the daytime, and as a result, one or more of the cores 200A-H may reduce the overall number of threads that are being executed. In some embodiments, a change in the power consumption may be the result of a reduction in the overall number of threads that one or more of the cores 200A-H (shown in FIG. 2) may be executing. In other words, in the embodiments where each of the cores 200A-H may be capable of executing up to eight threads concurrently, a change in power state may be merited when the number of threads being executed is less than eight. As is described below, some embodiments may allow the overall power consumption to be controlled by turning off one or more of the cores 200A-H while adjusting the clock at each header circuit 302.

In block 410, the symbol from the CCU 270 to the header circuit 302 (shown in FIG. 3A) may be periodically sent to the header circuit 302 for processing. The cluster header 302 may receive this symbol and load it into the shift register 305, per block 415.

The shift register may shift this symbol out per block 420, where in some embodiments, this shifting may be synchronous with the clock signal. For example, the shifting that may occur in block 420 may coincide with a timing signal that has a frequency between the clock signal and the output signal provided on the signal line 315. The gating structure 310 may utilize the symbol provided along with this timing signal to produce the resulting output signal on the signal line 315, where the resulting signal on the signal line 315 may be either gated (per block 425) or non-gated (per block 430).

When the signal is gated, per block 425, the signal line 315 may be substantially zero. On the other hand, when the signal is not gated, per block 430, the signal line 315 may be similar to the clock signal from the CCU 270.

FIG. 5 illustrates a plurality of possible waveforms 505, 510, and 515 that may result from the gating method 400 shown in FIG. 4. It should be noted that other waveforms are possible. Referring to FIG. 5, the clock signal coming into CCU 270 is shown as the waveform 501. In the example shown, the waveform 501 includes eight cycles, although other embodiments may include any number of cycles in the clock signal, and therefore, the signal 501 may take any variety of forms.

The waveform 502 may represent a possible symbol signal coming into the header circuit 302 and/or shift register 305. During operation, the gating structure 310 may logically combine the symbol 502 with the clock signal 501 as it is shifted out of the shift register 305 (per block 420). In some embodiments, this gating may be logically AND-ing the clock 501 with the symbol 502 on a cycle-by-cycle basis as the symbol is shifted out of the shift register. Although the waveform 502 is shown as having cycles that may correspond to the clock 501 (i.e., shown herein with eight cycles), it too may include any number of cycles, where the cycles may or may not correspond to the cycles of the clock 501.

The logical combination of the clock 501 and the symbol 502 may produce a resulting signal 505, which then may be delivered to the particular block that the header circuit 302 may be associated with. For example, if the header circuit 302 is the header circuit 280A within the core 200A-H, then the resulting signal 505 may be distributed to the core 200A-H to adjust its overall power consumption. Note that the symbol 502 is a "full power" signal, where all the constituent bits are "1s", and therefore, the resulting signal 505 is substantially the same as the clock signal 501. This may cause the core 200A to consume the maximum amount of power. Other symbols may result in lower power consumption settings.

For example, FIG. 5 illustrates another symbol 506 that may be logically combined with the clock signal 501 to produce the resulting signal 510. Note that the fifth constituent bit of the symbol 506 includes a "0" or low value such that the resulting clock signal 510 may have a missing pulse every eight cycles. This may cause the block to skip execution every fifth cycle and consume substantially less power than it otherwise would have. By gating the same number of pulses as the number of cores 200A-H that are turned off, the overall issue rate of the threads may remain the same. In other words, by turning off one of the eight cores, e.g., the core 200A, and gating the clock as shown in the resulting signal 510, the overall issue rate of the active cores 200B-H may be maintained. Also, since the number of executing threads may decrease and the size of the cache may be maintained, there may be a greater proportion of effective available cache to the executing threads.

Furthermore, since other blocks within the processor 113 may receive the same symbol 506 (such as the cache 220 and/or the crossbar 210), each of these blocks also may be coordinated to skip execution every fifth cycle. This may be true for each block within the processor 113 that receives the same signal from the CCU 270.

FIG. 5 illustrates yet another exemplary signal 511 that may be logically combined with the clock signal 501 to produce the resulting signal 515. Here, the second and fifth constituent bits are "0" or low. This may correspond, for example, to the situation where the two cores, e.g., 200A-B are turned off. Again, the overall issue rate of the executing threads may remain the same and there may be a greater proportion of the cache available to these executing threads.

Additionally, in some embodiments, all threads may remain active and the clock signal may be gated within each block to control the power consumed therein. For example, if the overall workload for each thread is low, then the overall execution rate of one or more blocks may be controlled by locally gating the clock signal as described above. This situation may occur when the temperature of the processor exceeds a predetermined amount, and as a result, one or more blocks may have their clocks gated to control the amount of power consumed. Notably this may occur without adjusting the PLL, which may require re-locking the PLL.

The symbol bit patterns, and the consequent number of blocks that are turned off, may be based on any variety of system conditions. For example, the symbol pattern may be determined from heuristic evaluations of system performance. Thus, a programmer may determine symbol patterns based upon measured performance of the computer system 100 during execution of certain applications and coordinate the powering on and off of blocks accordingly.

The above discussion is meant to be illustrative of the principles and various embodiments of the present invention. Numerous variations and modifications will become apparent once the above disclosure is fully appreciated. For example, the data structures and code described in this detailed description may be stored on a computer readable storage medium, which may be any device or medium that can store code and/or data for use by a computer system. This may include, but is not limited to, magnetic and optical storage devices such as disk drives, magnetic tape, compact discs (CDs) and digital video discs (DVDs), and computer instruction signals embodied in a transmission medium. For example, the transmission medium may include a communications network, such as the Internet. The claims should be interpreted to include any and all such variations and modifications. In addition, the above description has broad application, and the discussion of any embodiment is meant only to be exemplary, and is not intended to intimate that the scope of the disclosure, including the claims, is limited to these embodiments.

What is claimed is:

1. A method of power savings on a processor executing a plurality of threads on a plurality of cores, the method comprising the acts of:
   providing a first timing signal to a processor;
   determining the power requirements of the processor from a plurality of factors related to system conditions;
   obtaining a symbol comprising a bit pattern associated with the determined power requirements of the processor, the determined power requirements based on the plurality of factors related to system conditions;
   loading the symbol into a shift register; and
   providing a second timing signal to the processor, wherein the second timing signal includes a gated representation of the first timing signal and the symbol.

2. The method of claim 1, further comprising shifting the symbol out of the shift register synchronous to the first clock signal.

3. The method of claim 1, wherein the act of loading the symbol is periodic; and further comprising gating the first timing signal and the symbol synchronous to the first timing signal.

4. The method of claim 1, further comprising the act of adjusting the bit pattern in the symbol to relate to the number of threads that are active.

5. The method of claim 1, wherein the bit pattern for the symbol is based on one or more heuristic measurements.

6. The method of claim 1, wherein the act of loading further comprises loading a separate symbol into each core.

7. The method of claim 1, where the power savings on the processor is achieved by providing the second timing signal to at least one functional block of the processor causing the at least one functional block to skip one or more execution cycles thereby reducing power consumption of the processor.

8. The method of claim 4, wherein an overall issue rate for the plurality of threads stays substantially the same as before the act of adjusting the bit pattern occurred.

9. A multi-threaded processor, comprising:
a plurality of cores, wherein each core within the plurality comprises one or more header circuits; and
a clock control unit (CCU) coupled to the one or more header circuits;
wherein the CCU provides a first timing signal and a symbol to the one or more header circuits, wherein the symbol is associated with the power requirements of the processor; and
wherein each of the one or more header circuits provide a second timing signal to the plurality of cores, wherein the second timing signal includes a gated representation of the first timing signal and the symbol.

10. The processor of claim 9, wherein the CCU periodically provides the symbol to the header circuit.

11. The processor of claim 10, wherein a bit pattern in the symbol is adjusted to relate to the number of active threads within the plurality of cores.

12. The processor of claim 10, wherein the header circuit further comprises a shift register to receive the symbol and wherein the symbol is shifted out of the shift register synchronous to the first timing signal.

13. The processor of claim 10, wherein a bit pattern symbol is adjusted based on one or more heuristic measurements.

14. The processor of claim 10, wherein each header circuit receives a separate symbol.

15. The processor of claim 11, wherein a rate of a plurality of threads issued by the processor remains substantially the same as before the bit pattern is adjusted.

16. The processor of claim 11, further comprising a cache coupled to the plurality of cores, wherein the processor enters a lower power state and wherein a greater proportion of cache is available a plurality of threads executing on the processor.

17. A computer system, comprising:
an input unit;
a processor coupled to the input unit, the processor comprising:
a plurality of cores, wherein each core within the plurality comprises one or more header circuits;
a clock control unit (CCU) coupled to the one or more header circuits;
wherein the CCU provides a first timing signal and a symbol to the one or more header circuits, wherein the symbol is associated with the power requirements of the processor; and
wherein each of the one or more header circuits provide a second timing signal to the plurality of cores, wherein the second timing signal includes a gated representation of the first timing signal and the symbol.

18. The computer system of claim 17, wherein the CCU periodically provides the symbol to the header circuit.

19. The computer system of claim 18, wherein a bit pattern in the symbol is adjusted to relate to the number of active threads within the plurality of cores.

20. The computer system of claim 19, wherein a rate of a plurality of threads issued by the processor remains substantially the same as before the bit pattern is adjusted.

* * * * *